(12) United States Patent
Li

(10) Patent No.: US 11,561,396 B2
(45) Date of Patent: Jan. 24, 2023

(54) HEAD-UP DISPLAY DEVICE AND TRANSPORTATION DEVICE

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 501 days.

(21) Appl. No.: 16/626,316

(22) PCT Filed: Jan. 25, 2018

(86) PCT No.: PCT/CN2018/074119
§ 371 (c)(1),
(2) Date: Dec. 23, 2019

(87) PCT Pub. No.: WO2018/233288
PCT Pub. Date: Dec. 27, 2018

(65) Prior Publication Data
US 2020/0301145 A1 Sep. 24, 2020

(30) Foreign Application Priority Data
Jun. 23, 2017 (CN) .......................... 201710488324.8

(51) Int. Cl.
G02B 27/01 (2006.01)
B60K 35/00 (2006.01)
(Continued)

(52) U.S. Cl.
CPC .......... *G02B 27/0149* (2013.01); *B60K 35/00* (2013.01); *G02B 26/085* (2013.01);
(Continued)

(58) Field of Classification Search
None
See application file for complete search history.

(56) References Cited

U.S. PATENT DOCUMENTS 8,810,880 B2 8/2014 Hamano et al.
9,291,819 B2 3/2016 Ferri
(Continued)

FOREIGN PATENT DOCUMENTS

CN 101464562 A 6/2009
CN 102105831 A 6/2011
(Continued)

OTHER PUBLICATIONS

First Office Action dated Jul. 23, 2019 for corresponding Chinese application 201710488324.8.
(Continued)

*Primary Examiner* — Jennifer D. Carruth
(74) *Attorney, Agent, or Firm* — Nath, Goldberg & Meyer; Joshua B. Goldberg

(57) ABSTRACT

A head-up display device and a transportation device are provided. The head-up display device includes a light source, a scanner configured to scan light emitted from the light source to form scanned light, an angle adjuster configured to change an exit angle of the scanned light, a display unit configured to form an image according to the scanned light from the angle adjuster, and a projection assembly configured to project the image formed on the display component to a selected area.

19 Claims, 2 Drawing Sheets

(51) Int. Cl.
    *G02B 26/08*     (2006.01)
    *G02B 26/10*     (2006.01)

(52) U.S. Cl.
    CPC ....... *G02B 26/0841* (2013.01); *G02B 26/101* (2013.01); *G02B 27/0101* (2013.01); *B60K 2370/1529* (2019.05); *B60K 2370/23* (2019.05); *G02B 2027/015* (2013.01); *G02B 2027/0112* (2013.01); *G02B 2027/0123* (2013.01); *G02B 2027/0154* (2013.01)

(56) References Cited

U.S. PATENT DOCUMENTS

| | | |
|---|---|---|
| 9,731,720 B2 | 8/2017 | Seo |
| 2007/0057781 A1* | 3/2007 | Breed .................. B60K 35/00 340/457.1 |
| 2009/0160736 A1 | 6/2009 | Shikita |
| 2012/0098819 A1* | 4/2012 | Furuya ............... G02B 27/0101 345/212 |
| 2015/0212321 A1* | 7/2015 | Zhao .................. G02B 27/0101 359/630 |
| 2016/0085084 A1* | 3/2016 | Masson .............. G02B 26/0833 353/30 |
| 2016/0147074 A1* | 5/2016 | Kobayashi ......... G02B 27/0179 345/7 |

FOREIGN PATENT DOCUMENTS

| | | |
|---|---|---|
| CN | 105564314 A | 5/2016 |
| CN | 106483664 A | 3/2017 |

OTHER PUBLICATIONS

Second Office Action dated Mar. 24, 2020 for corresponding Chinese application 201710488324.8.

* cited by examiner

HEAD-UP DISPLAY DEVICE AND TRANSPORTATION DEVICE

CROSS REFERENCE TO RELATED APPLICATIONS

This application claims the priority of Chinese patent application No. 201710488324.8, filed on Jun. 23, 2017, the contents of which are incorporated herein in their entirety by reference.

TECHNICAL FIELD

The present disclosure relates to the field of display technology, and particularly relates to a head-up display device and a transportation device.

BACKGROUND

Heads-up (Heads-Up) digital display devices are also referred to as head-up displays (HUDs) for projecting a virtual image of driving information (such as speed information and navigation information) onto a side of a front windshield, thereby allowing a driver to see the driving information without looking down at an instrument panel. With the application of the augmented reality (AR) technology to the field of the HUD, double-layer display becomes a good implementation for the AR HUD at present. Currently, the double-layer display mostly adopt two thin film transistor liquid crystal displays (TFT-LCDs) or a combination of a digital light processing (DLP) technology that is a display technology of the TI corporation and the TFT-LCDs (i.e., DLP+TFT-LCD) as a display component, but these two implementations have deficiencies in terms of power consumption, volume, brightness, cost effectiveness, and the like.

SUMMARY

According to an aspect of the present disclosure, embodiments of the present disclosure provide a head-up display device, including:
  a light source;
  a scanner configured to scan light emitted from the light source to form scanned light;
  an angle adjuster configured to change an exit angle of the scanned light;
  a display unit configured to form an image according to the scanned light from the angle adjuster; and
  a projection assembly configured to project the image formed on the display component to a selected area.

In some embodiments, the angle adjuster is configured to enlarge the exit angle of the scanned light.

In some embodiments, the display unit includes a plurality of display sub-units; and wherein the plurality of display sub-units are disposed independently, and distances from the plurality of display sub-units to the scanner are different from each other.

In some embodiments, at least some of the plurality of display sub-units have different sizes from each other.

In some embodiments, each of the plurality of display sub-units includes a diffuser plate.

In some embodiments, the angle adjuster includes an optical component configured to change the exit angle of the scanned light.

In some embodiments, the angle adjuster further includes a collimator configured to converge and collimate a light beam emitted from the light source, so as to allow the scanner to scan the light emitted from the light source to form the scanned light.

In some embodiments, the collimator includes a Fresnel lens, and the optical component includes a Fresnel lens.

In some embodiments, the collimator includes a Fresnel lens equivalent to a convex lens, and the optical component includes a Fresnel lens equivalent to a concave lens.

In some embodiments, the collimator includes a Fresnel lens, and the optical component includes a concave lens.

In some embodiments, the collimator includes the Fresnel lens equivalent to a convex lens.

In some embodiments, the collimator includes a convex lens, and the optical component includes a Fresnel lens.

In some embodiments, the optical component includes a Fresnel lens equivalent to a concave lens.

In some embodiments, the scanner includes a MEMS mirror.

In some embodiments, the MEMS mirror includes an electrostatically-driven MEMS mirror.

In some embodiments, the MEMS mirror includes an electromagnetically-driven MEMS mirror.

In some embodiments, the MEMS mirror includes a two-axis MEMS mirror.

In some embodiments, the light source includes a laser light source.

In some embodiments, the laser light source includes a plurality of laser light sources for emitting light beams of three primary colors R, G, and B, respectively.

In some embodiments, the projection assembly includes a reflector panel.

In another aspect of the present disclosure, embodiments of the present disclosure provide a transportation device, which includes a windshield and the head-up display device of any one of the foregoing embodiments, wherein the selected area includes a partial area of the windshield.

In some embodiments, the transportation device includes any one of an automobile, a train, an airplane, and a ship.

DETAILED DESCRIPTION

To enable one of ordinary skill in the art to better understand the technical solutions of the present disclosure, the present disclosure will be further described in detail below with reference to exemplary embodiments and the accompanying drawings.

Figure 1:
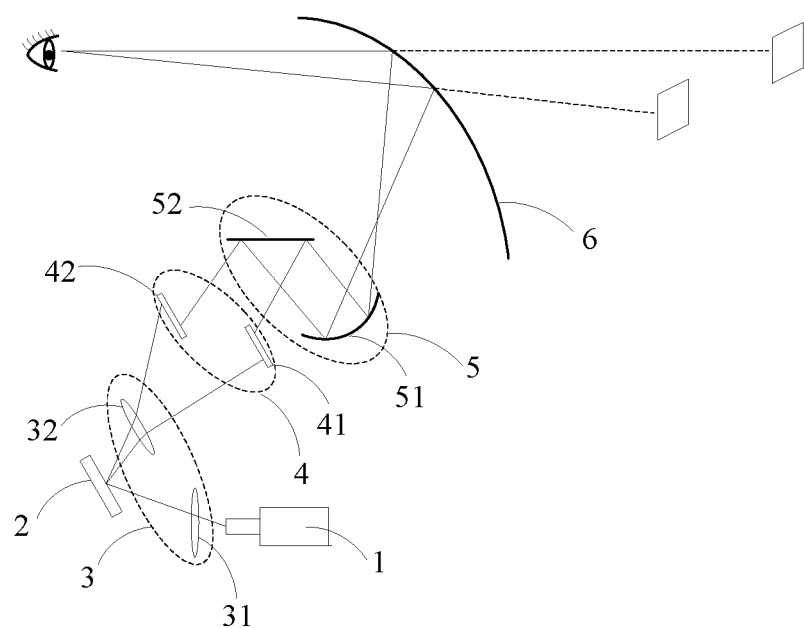
FIG. 1 is a schematic view of a head-up display device according to embodiments of the present disclosure.

As shown in FIG. 1, an embodiment of the present disclosure provides a head-up display device including: a light source 1, a scanner (e.g., a MEMS mirror 2), an angle adjuster 3, a display unit 4, and a projection assembly 5. The scanner may scan (e.g., reflect) light emitted from the light source 1 to form scanned light. The angle adjuster 3 may change (e.g., enlarge) an exit angle of the scanned light. The display unit 4 may form an image based on the scanned light from the angle adjuster 3. The projection assembly 5 may project the image formed on the display unit 4 onto a selected area. It should be understood that, the exit angle refers to an angle between the exit light beam and a normal line of an exit surface.

Optionally, the light source 1 of the head-up display device may be coupled to an image collecting unit (e.g., a camera) for collecting information (e.g., driving information such as speed information and navigation information) and generate and emit modulated light according to the collected information. Then, the scanner may scan the modulated light emitted from the light source 1 in two dimensions to form an image on the display unit 4. Finally, the projection assembly 5 may project the image formed on the display unit 4 on the selected area (e.g., a front windshield 6) to prompt the driver for the driving information.

Optionally, the light source 1 of the head-up display device may be connected to a controller of a transportation device (e.g., an engine control unit ECU of an automobile) on which the head-up display device is mounted, so as to collect information (e.g., driving information such as speed information and navigation information) and generate and emit the modulated light according to the collected information. The scanner then scans the modulated light emitted from the light source 1 in two dimensions to form an image on the display unit 4. Finally, the projection assembly 5 projects the image formed on the display unit 4 onto the selected area (e.g., the front windshield 6) to prompt the driver for the driving information.

In the technology known to the inventor, a deflection angle of the scanner ranges from about 15° to about 20°. Thus, a long optical path is required when the scanner performs scanning to form two or more images, in order to avoid the overlapping of the images, thereby causing a large volume of a head-up display device.

The head-up display device according to the embodiment of the present disclosure includes the angle adjuster 3. The angle adjuster 3 may change the exit angle of the scanned light formed by the scanner as needed, e.g., may enlarge the exit angle of the scanned light formed by the scanner. Therefore, it is possible to shorten the optical path when two or more images are formed, while overlapping of the images can be avoided, thereby reducing the volume of the head-up display device. It should be understood that, the deflection angle refers to an angle at which a plane, where the scanner is located, is capable of being deflected, such as the deflection angle α shown in FIGS. 2 to 4.

In some embodiments, the light source 1 may be a parallel beam light source, for example a laser light source such as a semiconductor laser or a solid state laser. The light source 1 may modulate an intensity of the light emitted therefrom by using a control circuit and emit the modulated light (hereinafter may be referred to as modulated light or a modulated light beam).

Optionally, the laser light source 1 may include three or more laser light sources that emit three primary color (R, G, and B) light beams, respectively. The three primary color (R, G, and B) light beams may form a color image after being combined, to allow the head-up display device to form a virtual image of full color.

In some embodiments, the scanner may include a MEMS (micro-electro-mechanical system) mirror (or reflector), a galvanometer mirror (or reflector), a polygon mirror, or the like. For example, the scanner may be a MEMS mirror 2 which contributes to miniaturization of the head-up display device.

In some embodiments, the MEMS mirror 2 includes an electrostatically-driven MEMS mirror or an electromagnetically-driven MEMS mirror.

In some embodiments, display unit 4 may include a plurality of display sub-units. The plurality of display sub-units may be independently provided, and distances from the plurality of display sub-units to the scanner (e.g., the MEMS mirror 2) may be different.

In some embodiments, the plurality of display sub-units may be diffuser plates having different specifications such as dimensions, for example, having different areas, different shapes, and/or the like.

Since the distances from the display sub-units to the scanner are different, overlapping of images may be avoided, while the images on the display sub-units may be projected at different positions (i.e., positions forming different viewing distances) in front of the selected area, respectively.

For brevity, description will be made by taking an embodiment of the present disclosure in which the display unit 4 includes two display sub-units (including a first display sub-unit 41 and a second display sub-unit 42, and a distance from the first display sub-unit 41 to the scanner being larger than a distance from the second display sub-unit 42 to the scanner) as an example. For example, the driving information may include speed information and a danger signal. The scanner may provide the danger signal to the first display sub-unit 41 and provide the speed information to the second display sub-unit 42. In this case, a distance between the first display sub-unit 41 and the second display sub-unit 42 may be adjusted, such that the speed information displayed by the second display sub-unit 42 may be imaged in front of the driver by 2 meters to 3 meters through the projection assembly 5, and for example, the formed image may be suspended above a hood of the automobile. Meanwhile, the danger signal displayed by the first display sub-unit 41 may be imaged in front of the driver by 5 meters to 10 meters through the projection assembly 5, and for example, the formed image may be suspended above the road surface in front of the automobile.

In some embodiments where the display unit 4 includes three or more display sub-units, at least some of the display sub-units have different sizes. Such an arrangement allows the head-up display device to project two layers of projected image that have a larger distance and a smaller distance from the driver (as indicated by the dotted lines in the upper right corner of FIG. 1) and have different sizes, respectively.

In some embodiments, each of the display sub-units may include a diffuser plate. Alternatively, each of the display sub-units may include a Fresnel lens, a diffuser screen, a screen combining a Fresnel lens and a diffuser plate, or the like.

In some embodiments, the projection assembly 5 may include a reflector panel, for example, the projection assembly 5 may include a curved reflector panel 51 and a planar reflector panel 52 as shown in FIG. 1, which project the light beams carrying various information from the display unit 4 onto the selected area (e.g., a partial area of a windshield) to form a nearer virtual image and a farther virtual image in front of the eyes of the driver (as indicated by the dotted lines in the upper right corner of FIG. 1).

In some embodiments, the angle adjuster 3 may include an optical component 32. The optical component 32 is configured to change the exit angle of the scanned light. The angle adjuster 3 in the embodiment of the present disclosure will further described below.

In some embodiments, the angle adjuster 3 may include a collimator 31. The collimator 31 is configured to converge and/or collimate the light beam emitted from the light source 1, such that the light emitted from the light source 1 is scanned (e.g., reflected) by the scanner to form the scanned light (e.g., the reflected light).

Figure 2:
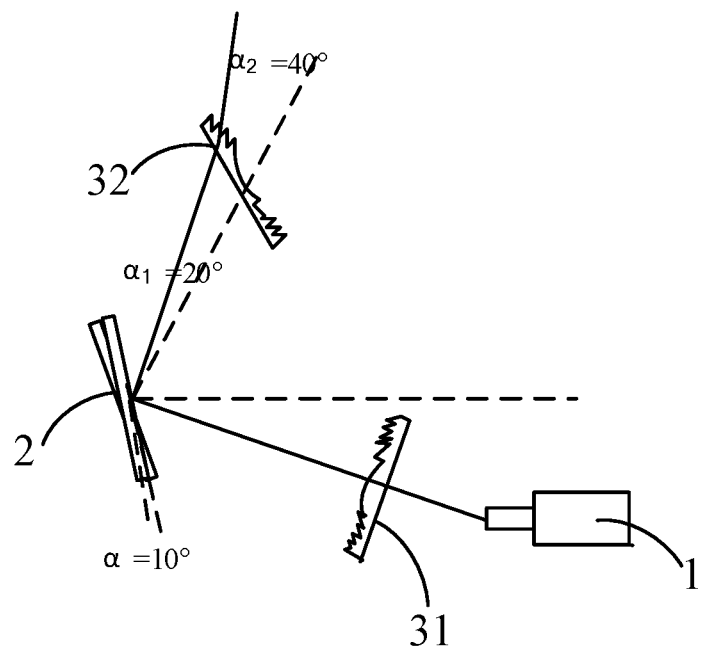
FIG. 2 is a schematic view of a head-up display device according to some embodiments of the present disclosure.

As shown in FIG. 2, in some embodiments of the present disclosure, the collimator 31 may include a Fresnel lens (e.g., a Fresnel lens equivalent to a convex lens), and the optical component 32 may also include a Fresnel lens (e.g., a Fresnel lens equivalent to a concave lens). In the example where the display unit 4 includes the first display sub-unit 41 for displaying the danger signal and the second display sub-unit 42 for displaying the speed information, the laser light emitted from the light source 1 of the head-up display device is converged and/or collimated by the Fresnel lens and then irradiated onto the MEMS mirror 2. The MEMS mirror 2 may be a two-axis MEMS scanning mirror (or referred to as a two-axis MEMS mirror) that may rotate at high speed around X and Y axes perpendicular to each other by electrostatic or electromagnetic means, so as to scan (e.g., reflect) light in the X and Y axes. The maximum deflection angles along the X and Y axes of the two-axis MEMS scanning mirror in the related art range from about 20° to about 15° respectively. For example, in a case where the deflection angle α of the MEMS mirror 2 is 10°, a deflection angle α1 of the scanned light after being scanning by the MEMS mirror 2 is 20° according to the theory of geometrical optics. The scanned light having the deflection angle of 20° is diffused through the optical component 32 (in this example, the optical component 32 may be a Fresnel lens equivalent to a concave lens) to result in that the final scanned light has a deflection angle α2 of 40°. Alternatively, the focal lengths of the two Fresnel lenses 31 and 32 and an interval between the two Fresnel lenses 31 and 32 may be set according to a practical application to control a magnification of the deflection angle of the scanned light. The scanned light diffused by the optical component 32 is irradiated to the display sub-units at corresponding positions, and for example, a danger signal is displayed on the first display sub-unit 41, and speed information is displayed on the second display sub-unit 42. As shown in FIG. 1, the second display sub-unit 42 is closer to the MEMS mirror 2 than the first display sub-unit 41, such that the projection member 5 finally projects the two images to the eyes of the driver and forms virtual images at two different positions, which are farther away from and closer to the driver, respectively, in front of the driver (where the virtual image displaying the speed information is closer to the driver than the virtual image displaying the danger signal).

Figure 3:
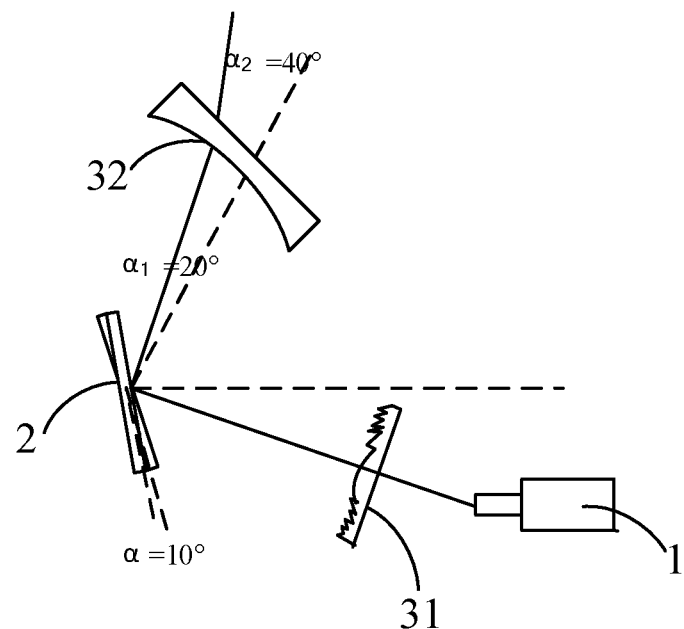
FIG. 3 is a schematic view of a head-up display device according to some embodiments of the present disclosure.

As shown in FIG. 3, in some embodiments of the present disclosure, the collimator 31 may include a Fresnel lens (e.g., a Fresnel lens equivalent to a convex lens), and the optical component 32 may include a concave lens. The operation principle of this kind of head-up display device is substantially the same as that of the head-up display device corresponding to FIG. 2, except that the concave lens is adopted to further enlarge the deflection angle of the scanned light of the MEMS mirror 2. In this case, the scanned light with the deflection angle α1 of 20° may also be diffused, such that the deflection angle α2 of the scanned light diffused through the optical component 32 is 40°. Alternatively, the focal lengths of the Fresnel lens and the concave lens and an interval between the Fresnel lens and the concave lens may be set according to a practical application to control a magnification of the deflection angle of the scanned light.

Figure 4:
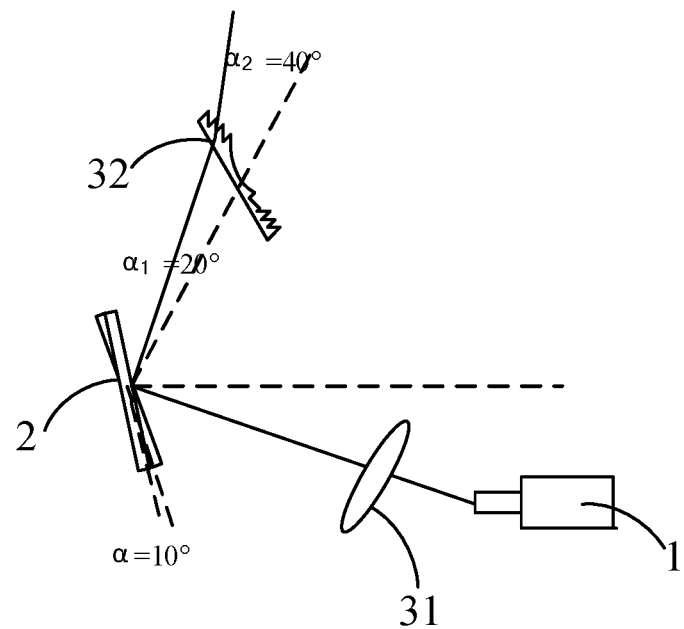
FIG. 4 is a schematic view of a head-up display device according to some embodiments of the present disclosure.

As shown in FIG. 4, in some embodiments of the present disclosure, the collimator 31 may be a convex lens, and the optical component 32 may be a Fresnel lens (e.g., a Fresnel lens equivalent to a concave lens). The operation principle of such a head-up display device is substantially the same as that of the head-up display device corresponding to FIG. 2, except that the laser light emitted from the light source 1 is converged and/or collimated by the convex lens, such that the collimated light is irradiated to the MEMS mirror 2.

The head-up display device according to each of the embodiments of the present disclosure have at least part of the following advantageous effects.

The deflection angle of the scanner in the related art ranges about 15° to 20°, therefore a long optical path is required when the scanner performs scanning to form two or more images, in order to avoid overlapping of the images, thereby causing a large volume of a head-up display device. In contrast, the head-up display device according to each of the embodiments of the present disclosure includes the angle adjuster that enlarges an exit angle of the scanned light formed by the scanner. Therefore, it is possible to shorten the optical path of the scanned light when two or more images are formed, while overlapping of the images can be avoided, thereby reducing the volume of the head-up display device.

Embodiments of the present disclosure further provide a transportation device including a windshield 6 and the head-up display device according to any one of the above embodiments, wherein the selected area is a partial area of the windshield 6. For example, the transportation device may include, but not limited to, any one of an automobile, a train, an airplane, and a ship.

Since the transportation device according to the embodiments of the present disclosure includes the head-up display device according to any one of the above embodiments of the present disclosure, information such as driving information, danger warning, and the like may be displayed on a partial area of the windshield 6 of the transportation device, to ensure that the driving of the driver is more convenient and safer.

It is to be understood that the above embodiments are merely exemplary embodiments for explaining the principles of the present disclosure, and the present disclosure is not limited thereto. It will be apparent to one of ordinary skill in the art that various changes and modifications may be made therein without departing from the spirit and essence of the present disclosure, and these changes and modifications also fall within the scope of the present disclosure.

What is claimed is:

1. A head-up display device, comprising:
a light source;
a scanner configured to scan light emitted from the light source to form scanned light;
an angle adjuster configured to change an exit angle of the scanned light;
a display unit configured to form an image according to the scanned light from the angle adjuster; and
a projection assembly configured to project the image formed on the display component to a selected area,
wherein the angle adjuster comprises an optical component configured to change the exit angle of the scanned light,
wherein the angle adjuster further comprises a collimator configured to converge and collimate a light beam emitted from the light source, so as to allow the scanner to scan the light emitted from the light source to form the scanned light, and wherein the collimator comprises a Fresnel lens, and the optical component comprises a Fresnel lens.

2. The head-up display device of claim 1, wherein the angle adjuster is configured to enlarge the exit angle of the scanned light.

3. The head-up display device of claim 1, wherein the display unit comprises a plurality of display sub-units; and
wherein the plurality of display sub-units are disposed independently, and distances from the plurality of display sub-units to the scanner are different from each other.

4. The head-up display device of claim 3, wherein at least some of the plurality of display sub-units have different sizes from each other.

5. The head-up display device of claim 3, wherein each of the plurality of display sub-units comprises a diffuser plate.

6. The head-up display device of claim 1, wherein the collimator comprises a Fresnel lens equivalent to a convex lens, and the optical component comprises a Fresnel lens equivalent to a concave lens.

7. The head-up display device of claim 1, wherein the scanner comprises a MEMS mirror.

8. The head-up display device of claim 7, wherein the MEMS mirror comprises an electrostatically-driven MEMS mirror.

9. The head-up display device of claim 7, wherein the MEMS mirror comprises an electromagnetically-driven MEMS mirror.

10. The head-up display device of claim 7, wherein the MEMS mirror comprises a two-axis MEMS mirror.

11. The head-up display device of claim 1, wherein the light source comprises a laser light source.

12. The head-up display device of claim 11, wherein the laser light source comprises a plurality of laser light sources for emitting light beams of three primary colors R, G, and B, respectively.

13. The head-up display device of claim 1, wherein the projection assembly comprises a reflector panel.

14. A transportation device, comprising a windshield and the head-up display device of claim 1, wherein the selected area is a partial area of the windshield.

15. The transportation device of claim 14, wherein the transportation device comprises any one of an automobile, a train, an airplane, and a ship.

16. A head-up display device, comprising:
a light source;
a scanner configured to scan light emitted from the light source to form scanned light;
an angle adjuster configured to change an exit angle of the scanned light;
a display unit configured to form an image according to the scanned light from the angle adjuster; and
a projection assembly configured to project the image formed on the display component to a selected area;
wherein the angle adjuster comprises an optical component configured to change the exit angle of the scanned light,
wherein the angle adjuster further comprises a collimator configured to converge and collimate a light beam emitted from the light source, so as to allow the scanner to scan the light emitted from the light source to form the scanned light, and
wherein the collimator comprises a Fresnel lens equivalent to a convex lens, and the optical component comprises a concave lens.

17. A transportation device, comprising a windshield and the head-up display device of claim 16, wherein the selected area is a partial area of the windshield.

18. A head-up display device, comprising:
a light source;
a scanner configured to scan light emitted from the light source to form scanned light;
an angle adjuster configured to change an exit angle of the scanned light;
a display unit configured to form an image according to the scanned light from the angle adjuster; and
a projection assembly configured to project the image formed on the display component to a selected area;
wherein the angle adjuster comprises an optical component configured to change the exit angle of the scanned light,
wherein the angle adjuster further comprises a collimator configured to converge and collimate a light beam emitted from the light source, so as to allow the scanner to scan the light emitted from the light source to form the scanned light, and
wherein the collimator comprises a convex lens, and the optical component comprises a Fresnel lens equivalent to a concave lens.

19. A transportation device, comprising a windshield and the head-up display device of claim 18, wherein the selected area is a partial area of the windshield.

* * * * *